United States Patent

[11] 3,630,435

[72] Inventor  Jack B. Titus
               132 Elliott, Mather Air Force Base, Calif. 95655
[21] Appl. No. 40,062
[22] Filed     May 25, 1970
[45] Patented  Dec. 28, 1971

[54] AEROTRACK, AIR-NAVIGATION TRIANGULATION COMPUTER
     11 Claims, 10 Drawing Figs.
[52] U.S. Cl. .................................. 235/78, 235/61 NV
[51] Int. Cl. ................................... G06c 27/00
[50] Field of Search .......................... 235/78, 61 NV, 88

[56]                References Cited
                UNITED STATES PATENTS
2,966,298  12/1960  Newman .................... 235/83
3,262,640   7/1966  Jameson ................... 235/78
3,486,691  12/1969  Rodriguez ................. 235/88
3,497,681   2/1970  Warner .................... 235/78

Primary Examiner—Stephen J. Tomsky
Attorneys—Harry A. Herbert, Jr and Arthur R. Parker ABSTRACT: An air-navigation computer including a base disc element inscribed with a logarithmic scale, and movably mounted trig ring, compass indicator, combined master cursor and relative bearing indicator and wind direction pointer elements rotatably supported on the top surface of the base disc element. The compass indicator and wind direction pointer are slaved to the combined master cursor and relative bearing indicator, and a secondary cursor is rotatably mounted to the bottom of the base disc element.

Patented Dec. 28, 1971 3,630,435

INVENTOR.
JACK B. TITUS
BY Harry A. Herbert Jr.
ATTORNEY
Arthur R. Parker
AGENT

Patented Dec. 28, 1971

INVENTOR.
JACK B. TITUS
BY Harry A. Herbert Jr
ATTORNEY
Arthur R. Parker
AGENT

Patented Dec. 28, 1971
3,630,435
3 Sheets-Sheet 3
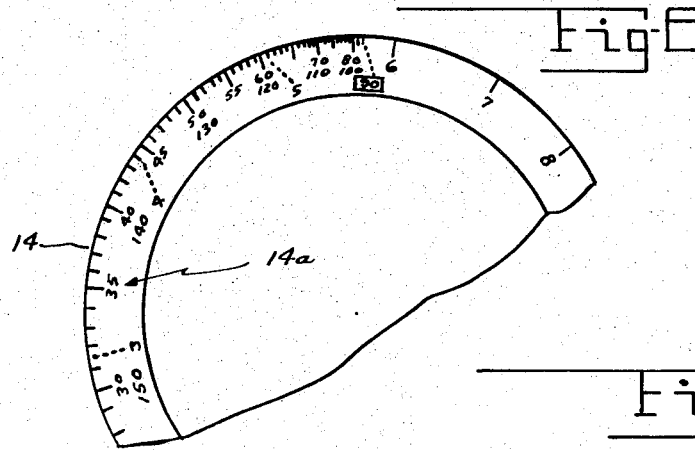
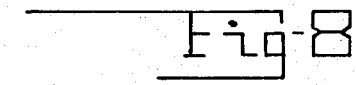
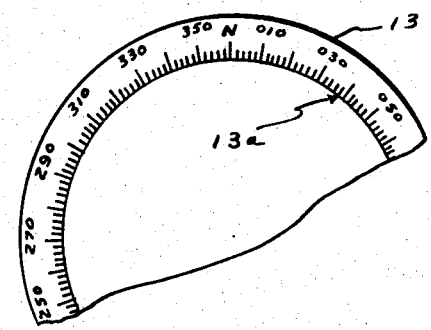
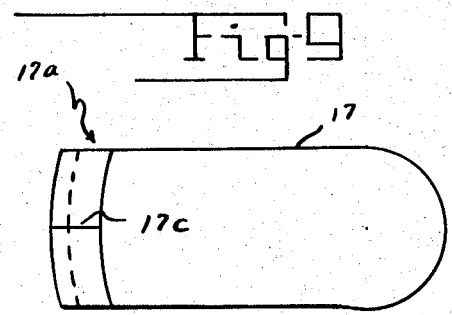
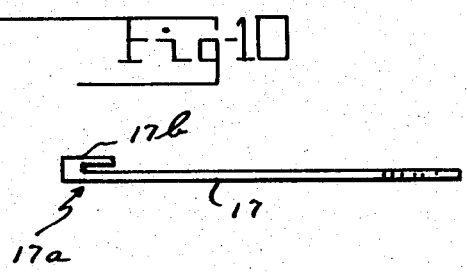
INVENTOR.
JACK B. TITUS
BY Harry A. Herbert Jr
ATTORNEY
Arthur R. Parker
AGENT

AEROTRACK, AIR-NAVIGATION TRIANGULATION COMPUTER

BACKGROUND OF THE INVENTION

This invention, which relates generally to the field of dead-reckoning navigation, constitutes an improvement over a previously developed air-navigation computer invented and described and claimed in applicant's prior patent application, Ser. No. 708,909, filed on Feb. 28, 1968, and subsequently issued as U.S. Pat. No. 3,471,084, on Oct. 7, 1969, on an invention entitled "A Trigonometric Aeronautical Computer, TRAC."

In the dead-reckoning navigation of an aircraft, the actual track that the aircraft is making good over the earth's surface and its instantaneous position at all times may be determined, for example, by reference to a known position, such as the aircraft's departure point, and thereafter plotting the aircraft heading or headings from that departure point, the exact distance flown on each heading, and finally periodically correcting certain navigational data for changes in the environmental conditions of air temperature, and altitude or pressure. Such air-navigational problems may be solved by a hand drawing of what is called the triangle of velocities or wind triangle to a selected scale on a sheet of paper to determine, for example, what compass heading should be flown to make good a particular or selected track or true course over the earth's surface and, in addition, to determine what ground speed is actually being made for a particular airspeed. However, where the aircraft being navigated is relatively fast and/or the flight is of comparatively long duration, the use of such hand drawn triangles becomes too slow and, therefore, impractical because of the innumerable calculations involved.

Numerous and various types of the hand held air-navigation computers have been previously developed and have been utilized for many years in the dead-reckoning navigation of various aircraft. Most of these computers have relied upon the circular slide rule principle and generally have incorporated a slidably positioned element inscribed, for example, with units of time, speed and wind drift correction angles. Moreover, such computers often include logarithmic scales and some means of converting indicated, calibrated airspeed to true airspeed, and altimeter readings to true altitude. Naturally, it is highly important and of great use for the navigator and, in particular, for the pilot acting as his own navigator to be equipped with some kind of hand held computer device that is simple and may be handled and operated basically with one hand, while the data being collected from its use is being recorded with the other hand. For this purpose, the device described and claimed in applicant's previously mentioned U.S. Pat. No. 3,471,084 was developed. The air-navigation computer device of the present invention was developed as a further improvement thereof and will be hereinafter described in the following summary and detailed description. In this connection, the present device not only constitutes a significant development in the solution of basic dead-reckoning problems, but it is also, like its predecessor, uniquely applicable to use with tactical air navigation (TACAN).

SUMMARY OF THE INVENTION

The present invention consists briefly in a new and improved air-navigation computer having a base disc element inscribed with a logarithmthic scale, a relative bearing scale-disc centered over the base disc element and movable relative thereto, and a trigonometric scale-inscribed ring member, compass indicator ring, and wind direction disc members positioned over and movable relative to the relative bearing scale-disc. A master cursor element is uniquely and permanently laminated to an inner diameter portion of the relative bearing disc, and a secondary cursor element is rotatably positioned to the underside of the base disc element. The compass indicator ring and wind direction disc are uniquely slaved to the rotation of the combined master cursor element and relative bearing disc for particular application in tactical air navigation (TACAN).

The unique advantages of the present air-navigation computer will become apparent from the following disclosure thereof, taken in connection with the accompanying drawings, in which:

BRIEF DESCRIPTION OF THE DRAWINGS

FIG. 6 is another top view, representing the separate trig ring of the invention, showing the trigonometric sine indicia or scale inscribed thereon;

FIG. 8 represents an additional top view, showing the compass indicator ring of the inventive air-navigation computer; and FIGS. 9 and 10 are top and side elevational views, respectively, of the uniquely arranged secondary cursor element positioned to the bottom of the inventive computer.

DESCRIPTION OF THE PREFERRED EMBODIMENT

Figures 1, 2:
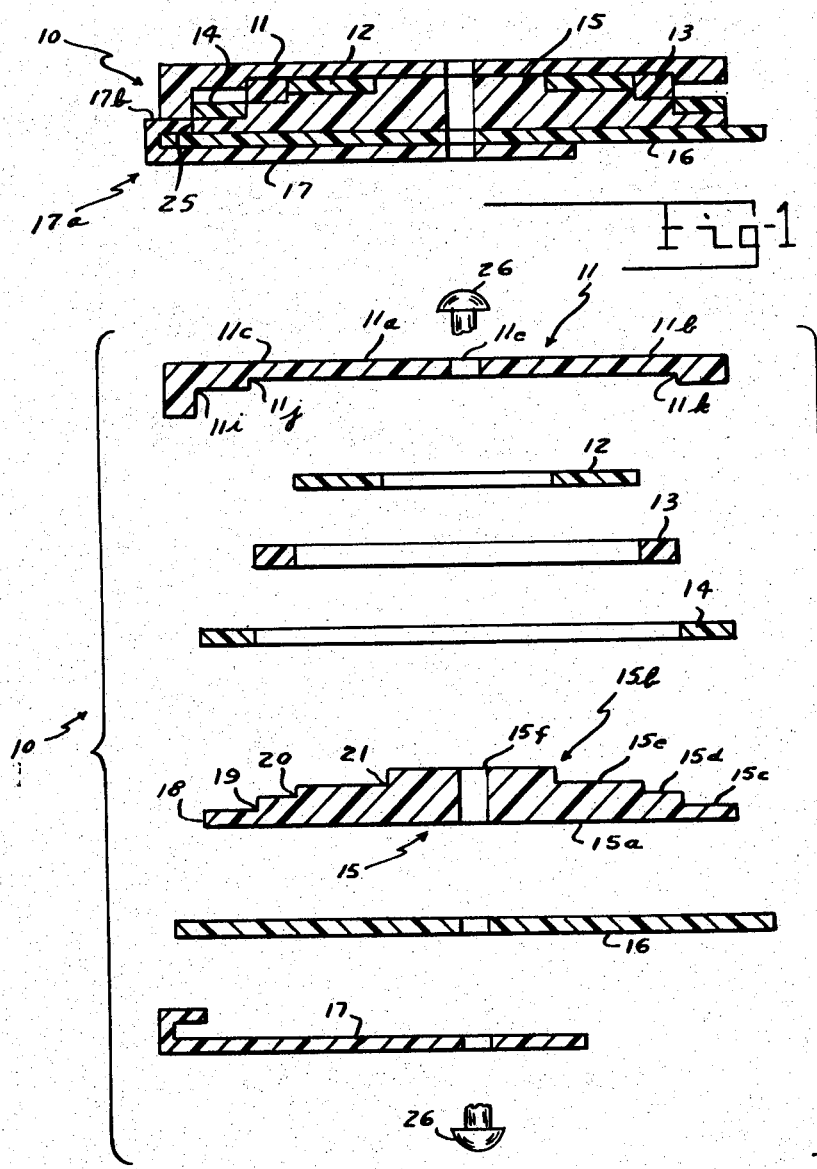
FIG. 1 is an overall assembly, in cross section, of the improved aerial navigation computer of the present invention.
FIG. 2 represents an exploded view, in cross section, of the overall assembly of FIG. 1, more clearly illustrating details of the individual components comprising the inventive air navigation computer.
Figure 3:
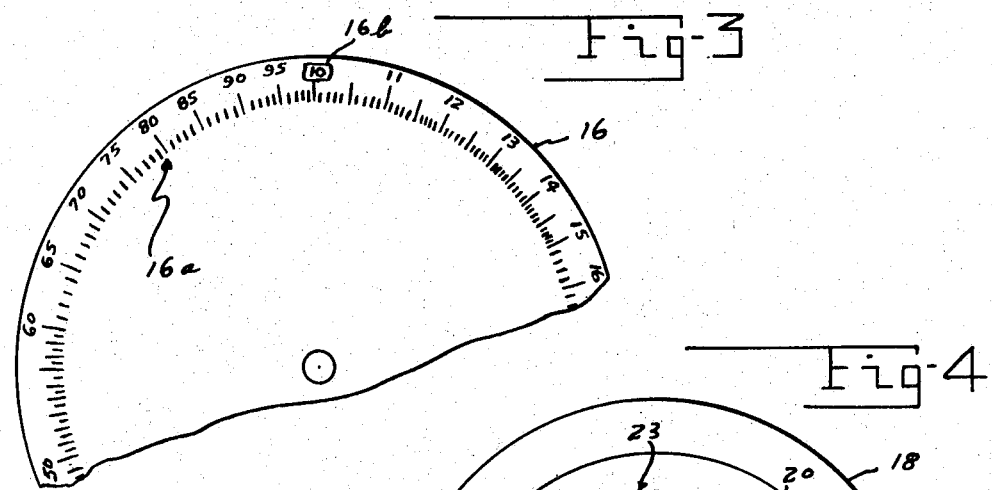
FIG. 3 is a top view of the base disc incorporated in the overall assembly and exploded views of FIGS. 1 and 2, illustrating a standard type logarithmic scale inscribed thereon.

Referring to the drawings and, in particular, to FIGS. 1 and 2 thereof, the improved air-navigation computer of the present invention is respectively indicated in fully assembled and exploded condition at 10 as including a master cursor 11, a wind direction pointer disc 12, a compass indicator ring 13, a trig ring 14, a relative bearing pointer disc 15, a base disc 16 and a secondary cursor 17. As clearly seen in FIG. 3, the base disc 16, which essentially forms the main support for the remaining components of the invention, may consist preferably of a solid circular disclike structure that is nontransparent or white and may be preferably 1/32 inches thick and 4 ¼ inches in diameter. A standard-type logarithmic scale may be inscribed on the said base disc 16 at its 3 ¾ inch diameter, as is indicated generally at 16a, each 10 units of which being marked with an antilogarithmic numeral varying in value from 10 through 95, when measured clockwise. The numeral 10 may be inscribed as shown at the top of the scale and further enclosed within an index mark in the form of a box or square, indicated by the reference numeral at 16b. It is noted that each number on the said scale 16a may represent any multiple of 10, similar to any slide rule.

Figure 4:
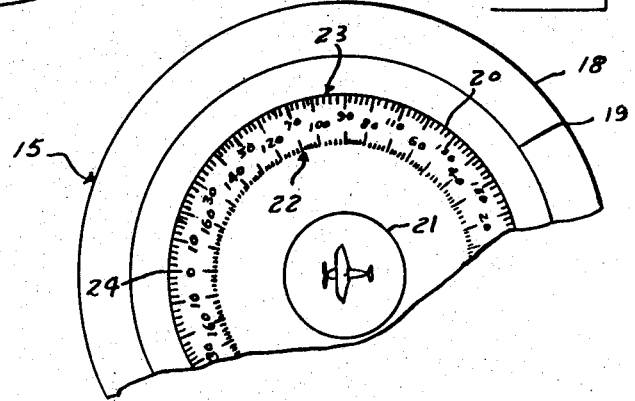
FIG. 4 is a top view of the relative bearing pointer disc of the invention illustrating details of the relative bearing scales inscribed thereon.

Movably mounted relative to, and on the top surface of the above-described base disc 16 is the aforementioned relative bearing pointer disc 15 which, as seen particularly in FIGS. 2 and 4, consists of a circular unit having a flat underside at 15a and an upper or top surface indicated generally at 15b, which is uniquely configured, as clearly illustrated, to form a plurality of stepped portions at 15c, d and e which are flat and constitute respectively a series of circumferentially disposed diameter portions forming rotatable support for and interfitted with the previously mentioned trig ring 14, compass indicator ring 13 and wind-direction pointer disc 12, respectively, as will be hereinafter explained in more detail.

The aforementioned circular unit comprising the relative bearing pointer disc 15 may preferably include an outer diameter of 3¾ inches, the surface or edge of which being indicated at the reference numeral 18. It may have a thickness varying from 1/32 inch from said outer diameter surface 18 inwardly to the 3-inch diameter point, indicated at 19, thereafter increasing to 1/16 inch in thickness further inwardly to the 2 6/16-inch diameter point, at 20, then increasing still further to 3/32 inch in thickness inwardly to the 13/16-inch diameter point, at 21, and, finally increasing to a ⅛-inch thickness extending inwardly to the center of the tip or upper surface 15b to thereby form a flat, circular upstanding central relative bearing pointer disc portion at 15f. These varying thicknesses incorporated in the top or upper surface 15b of the aforesaid relative bearing pointer disc 15 naturally result in the unique system of flat, circumferentially disposed stepped portions, previously referred to at the reference numerals 15c, d and e.

A first, circumferentially disposed relative bearing scale is inscribed on the said relative bearing pointer disc 15 on the outer side of the 1⅞-inch diameter thereof, as indicated generally at 22 in FIG. 4, with indicia marked therealong for each 2° both clockwise and counterclockwise from zero to the 180° value. These indicia have been designated by numerals, inscribed within the 2 3/16-inch diameter, which reflect each 10° values. An important and improved characteristic of the scale 22 resides in the provision of a tinted background of green for degree values below 90°, and a tinted background of amber for degree values above 90°. The unique improvement here is that a two-color arrangement is utilized in accordance with the teaching of the present invention. It is noted that, although this color scheme has been omitted from the present drawings, it would, of course, be incorporated in the operational computer. Thus, much improved clarity and less confusion of the proper scales being read would result from the color scheme taught for the air-navigation computer of the present invention. A second, circumferential scale, at 23, is marked with 2° indicia both clockwise and counterclockwise from zero through 180°. Each 10° value of these indicia are designated with numerals inscribed between the indicia and the 2 3/16-inch diameter, and the zero degree value of the said second scale 23, as noted at 24, is directly aligned on the same radial as the 180° value of the first, relative bearing scale 22. Furthermore, an airplane silhouette (Note FIG. 4), which points directly toward the 180° value of the aforesaid relative bearing scale 22, is inscribed on the central portion of the said relative bearing pointer disc 15. This silhouette is placed within the 13/16-inch diameter.

The trig ring 14, which is depicted generally in FIGS. 1 and 2 and more particularly in FIG. 6, may preferably consist of a flat ringlike element having an outside diameter of 3¾ inches, an inside diameter of 3 inches and a constant thickness of 1/32 inch. The outer circumference, or immediately inwardly thereof, trig ring 14 may be inscribed with a trigonometric sine indicia scale, indicated generally at 14a, which indicia is marked thereon clockwise from 1° to 90° and counterclockwise from 90° through 170°, using a double row of numerals to reflect primary values. In this regard, numerals 1° through 5° have been inscribed close to the inner diameter and designated with dotted lines extending from the outer edge. For improved clarity and less confusion and thus insure correct and accurate readings under flight conditions, again, as in the previously described case of the relative bearing pointer disc 15, a two-color scheme is uniquely employed by the device of the present invention. In this situation, the trig ring 14 may be tinted a green color inwardly from the outer edge thereof to include the row of numerals below values of 90°, and tinted amber from the inner edge thereof outward to include the numerals above values of 90°. Again, this color scheme is not depicted in the view of FIG. 6 but would naturally be incorporated in the operational application thereof.

The compass indicator ring 13, depicted with greater particularity in FIG. 8, may preferably consist of a white flat ring element 1/16 inch in thickness and having outer and inner diameters measuring 3 and 2 7/16 inches, respectively. Its inner diameter is inscribed with indicia for each 2° of the compass, as is indicated generally at 13a.

Figure 7:
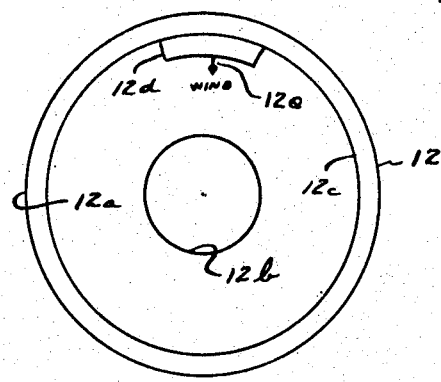
FIG. 7 represents still another top view, more clearly illustrating the wind direction pointer disc utilized with the present invention.

The aforesaid wind direction pointer disc 12, which is seen particularly in FIG. 7, may consist of a disclike member, 1/32-inch thick and further incorporates outer and inner diameters of 2 7/16 and 13/16 inches, as is indicated respectively at 12a and 12b. This disc is also made transparent from its outer edge or circumference 12a inward to the 2 3/16-inch diameter, represented by the reference numeral at 12c. Moreover, it incorporates an additional transparent area or window, indicated generally at 12d, which is 40° wide, and a wind arrow is incorporated as shown at 12e, which is inscribed inwardly from the center of the said window 12d for a purpose to be hereinafter described with reference to the operation of the inventive computer.

Figure 5:
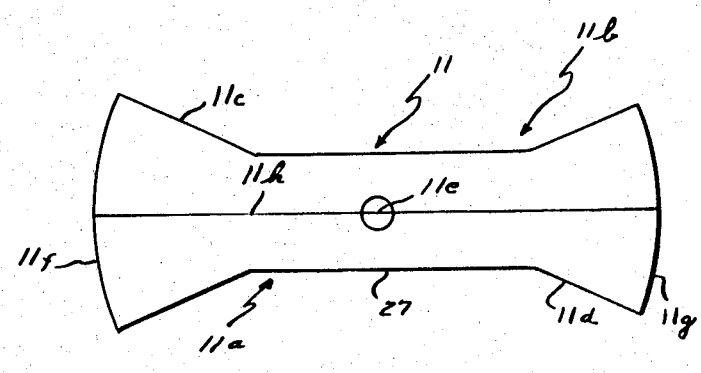
FIG. 5 is a further top view, illustrating details of the cursor element generally used with the computer of the present invention and, in particular, combined with the relative bearing pointer disc of FIG. 4, for example.

The exact configuration of the master cursor 11 is illustrated in FIGS. 2 and 5. It may consist of a transparent unit or component that is centered on the top or upper surface and about the pivot center of the assembled computer. When so centered, said master cursor 11 incorporates opposing tip portions 11a and 11b, measuring 2⅛ and 1⅞ inches, respectively, from the pivot center thereof, indicated at 11e. The relatively narrow length of the said master cursor 11; namely, the portion thereof indicated generally at 27, may be made 13/16 inch in width. Each of the said tips 11a, 11b is flanged outwardly, as seen clearly in FIG. 5 at the reference numerals 11c and 11d, respectively, on radial lines extending from the said pivot center 11e to create an outer edge arc of 45°, as indicated at 11f and 11g. In addition, a centrally disposed master cursor index line 11h is inscribed through this unit from the center of each tip. As particularly viewed in FIG. 2, the underside of the master cursor 11 is made of varying thicknesses with the longest tip portion 11c having a thickness of 5/32 inch starting at its outermost edge and extending inwardly to the 3¾-inch diameter point at 11i where the thickness thereof reduces to 3/32 inch for a distance extending further inwardly to the 3-inch diameter point at 11j, from whence the thickness is further reduced to 1/32 inch inwardly to the center of the said master cursor. The opposing tip portion 11b begins with a thickness of 3/32 inch at its outermost tip portion extending inwardly to the said 3-inch diameter point from whence it is naturally likewise reduced to the aforementioned 1/32-inch thickness beginning at the point 11k and thereafter extending inwardly to the unit pivot center at 11e.

The secondary cursor 17, seen more clearly in FIGS. 9 and 10, may consist of a transparent unit generally 1/32-inch thick and 1 inch in width. It is attached to the underside of the computer 10, when the latter is assembled as illustrated in the previously mentioned FIG. 1. The single tip of the said secondary cursor 17, indicated generally at 17a, is formed with a reversed tip portion 17b that is specifically designed to overlap and extend over, and relatively snugly interfit both the outer circumferential edge and upper surface of the base disc 16, as seen clearly in FIG. 1. The said secondary cursor tip portion 17b extends further inwardly to the 3¾-inch diameter portion of the base disc 16, or, in other words, to the point indicated by the reference numeral 25 which substantially abuts the outer circumference of the previously described relative bearing pointer disc 15. The center of the secondary cursor tip portion 17b is inscribed with a line 17c (Note FIG. 9) formed along a radial line projected from the pivot center of the present computer.

As particularly illustrated in FIGS. 1 and 2, computer 10 is assembled by initially centering the relative bearing pointer disc 15 over the base disc 16, and thereafter, in turn, mounting the trig ring 14, compass indicator ring 13, and the wind direction pointer disc 15 in their proper supporting and relatively rotatable position over the previously described stepped portions, 15c, d, and e, provided therefor by the different thicknesses incorporated in the said relative bearing pointer disc 15. In this regard, a unique feature of the present air-navigation computer 10 is that the previously described master cursor 11 is permanently laminated to the inner 13/16-inch diameter surface 15f (Note FIG. 2) of the relative bearing pointer disc 15, thereby forming an improved and novel combined master cursor and relative bearing unit that further facilitates and therefore improves the computational functions of the device of the present invention. This lamination is constructed so that the portion of the cursor line 11h leading to the longest tip portion 11c is aligned directly over the 180° value of the previously described relative bearing scale 22 formed on the said disc 15.

To complete the final assembly of the present computer 10, all of the individual components thereof, except for the trig ring 14, the compass indicator ring 13 and the wind direction pointer disc 12 may be drilled with a ⅛-inch diameter hole at the computer's center point, and a metal center-fastening rivet, as at 26 in FIG. 2, thereafter used to fasten all components to the base disc 16. The said center-fastening rivet 26 will then hold all of the computer units in position under sufficient pressure to create significantly more friction between the base disc 16 and the relative bearing pointer disc 15 than that which exists between any other pair of components. An additional unique and important feature of the present computer, particularly when it is used in connection with tactical air navigation (TACAN), resides in an inherently built-in friction characteristic which results in both the compass indicator ring 13 and the wind direction pointer disc 12 being normally slaved to the combined master cursor relative bearing unit 11, 15, to thereby create an even further improved air-navigation computer.

The various applications and operating procedures utilizing the present air-navigation computer will be described hereinafter in connection with the following operating instructions:

1. To solve Ground Speed and Wind Drift:
   a. Place true air speed and true course under master cursor line 11h of the longest tip 11c of the master cursor 11, using the base disc 16 and the compass indicator ring 13, respectively.
   b. Rotate the wind direction pointer disc 12 to the wind direction on the compass indicator ring 13 and read the relative wind angle under the wind arrow 12e. A green background represents a tail wind component and an amber background indicates a head wind component. The airplane silhouette and the wind arrow uniquely provide a visual display of course and wind relationships.
   c. Rotate the trig ring 14 to place the relative wind angle under the master cursor line 11h. Trig ring values less than 90° have a green background to denote a tail wind; values greater than 90° have an amber background to denote a head wind.
   d. Read drift angle on the trig ring 14 opposite the wind velocity on the base disc 16. True heading may be derived from the compass indicator ring 13 at a point opposite the outer diameter relative bearing scale value which corresponds to the drift angle, insuring that the drift measurement is made toward the wind arrow 12e.
   e. Using the trig ring 14, add the drift angle to the relative wind angle and opposite the sum derived on the trig ring 14 read the ground speed on the base disc 16.

2. To solve Wind Direction and Velocity:
   a. Place true air speed and true course under the longest master cursor tip 11c, using the base disc 16 and compass indicator ring 13, respectively.
   b. If needed, read the degrees of drift between true course and true heading on the outer diameter scale 23 of the relative bearing pointer disc 15.
   c. Rotate the trig ring 14 until the difference in the degree values opposite true air speed and ground speed on the base disc 16 equals the degrees of drift and read the relative wind angle under the cursor line 11h opposite true air speed. If ground speed is greater than true air speed, use degree values with the green background. If ground speed is less than true air speed, use values with the amber background.
   d. Rotate the wind direction pointer disc 12 from true course, through true heading, until the wind arrow 12e indicates the relative wind angle on the relative bearing disc 15 and then read wind direction on the compass indicator ring 13.
   e. Opposite the degrees of drift on the trig ring 14, read wind velocity on the base disc 16.

3. TACAN Direct Course Tracking: Note: In tactical air navigation (TACAN), the pilot/navigator receives information both as to distance and bearing of his aircraft from a selected TACAN ground station which produces a theoretically infinite number of radials emanating from the station like the spokes of a wheel. The procedure for using the present computer with such a TACAN station is as follows:
   a. Using the base disc 16 for distance values, place the long end of the master cursor 11 so that the indexing line 11h thereof is in direct alignment with the departure distance and place the secondary cursor member 17 so that the indexing line 17c thereof is directly over the destination distance.
   b. Using the compass indicator ring 13, place the inbound bearing to the TACAN station under the line 11e of the long tip end of the master cursor 11. Adjacent to the destination radial on the compass indicator ring 13 note the relative degree value on the outer diameter scale 23 of the relative bearing pointer disc 15.
   c. Rotate the trig ring 14 until the sum of the trig ring degree values under the two cursors 11, 17 is equal to the relative degree value previously noted on the relative bearing scale in (b) above. Read the direct course distance to the destination point on the base disc 16 opposite the relative degree value on the trig ring 14.
   d. Using the compass indicator ring 13, read the direct course degree value opposite the outer diameter scale 23 of the relative bearing direction pointer disc 15 which equals the trig ring value under the secondary cursor 17. This direct course value must appear between the departure point inbound bearing to the TACAN station and the destination point radial.

For continuous tracking by use of the improved computer of the present invention, as the aircraft proceeds along the direct course, adjust the compass indicator ring 13 to maintain the inbound bearing to the TACAN station under the cursor and rotate the master cursor assembly or unit comprising the relative bearing pointer disc 15, and the compass indicator ring 13 and wind direction pointer disc 12 slaved thereto to thereby maintain the same trig ring degree value under the secondary cursor 17 which appears on the outer diameter scale 23 opposite the direct course value on the compass indicator ring 13. The desired distance to the TACAN station will appear under the master cursor member 11 on the base disc 16. The direct course distance remaining may be determined by noting the relative degree value on the outer diameter relative bearing scale 23 which is opposite the destination radial on the compass indicator ring 13 and, subsequently, reading the distance opposite this relative degree value using the base disc element 16 and the trig ring 14, respectively.

I claim:

1. In an air-navigation computer, apparatus for determining both ground speed and wind drift and wind direction and velocity, comprising; a first, base disc member inscribed with a logarithmic scale representing a slide rule and marked with speed and distance indicia; a second, trigonometric scale-inscribed member mounted for movement relative to said base disc element; a third, movably mounted, compass indicator member positioned adjacent said second named member; a fourth, wind direction scale member incorporating a wind direction pointer element; a fifth, relative bearing pointer member rotatably positioned on said base disc member about a pivot center and interposed between and providing a common support for said trigonometric scale-inscribed, compass indicator and wind direction pointer members; a master cursor member supported on the upper surface of said computer and arranged in fixed relation to said relative bearing pointer member for common rotation therewith about said pivot center; and a secondary cursor element having an index line and rotatably adjusted about the pivot center of said computer and positioned on the bottom surface of said base disc member; said master cursor member having a pair of aligned opposing tip elements extending in opposite relation over the upper surface portion of the computer and comprising a first, relatively long tip portion having an index line in direct alignment with a predetermined point on said relative bearing pointer member and a second, relatively short tip portion incorporating an extension of said index line; said base disc and compass indicator members being rotatable to place certain values on the scales thereof respectively corresponding to a selected air speed and true course under the master cursor-index line of the longest tip portion of said master cursor; said wind direction scale member being rotatably mounted for adjustment about the pivot center of said computer to thereby align the selected wind direction on said compass indicator member and thus determine the relative wind angle on said trigonometric scale-inscribed member from the value appearing directly under said wind direction pointer element; said trigonometric scale-inscribed member being thereafter adjustable relative to its supporting relative bearing pointer member to thereby orient said previously determined relative wind angle directly under said master cursor-index line and thus determine drift angle on said last named scale member from the degree value inscribed thereon and appearing directly opposite the value representing the selected wind velocity on said base disc member, the value on the said base disc member appearing directly opposite the point on the trigonometric scale-inscribed member representing the sum of said relative wind angle and said drift angle constituting a measure of the computed ground speed for the selected airspeed and wind; said trigonometric scale-inscribed member being further adapted to be adjustable relative to said master cursor until the difference in the degree values between the selected true airspeed and precomputed ground speed on the said base disc member is made equal to the precomputed degrees of drift to thereby determine the relative wind angle from the value to be read directly under the cursor-index line opposite the true airspeed; said wind direction pointer being further adjustable from the selected true course, through the true heading, until said wind direction pointer element indicates the relative wind angle and the wind direction corresponding thereto found on said compass indicator member.

2. In an air-navigation computer as in claim 1, wherein said relative bearing pointer member incorporates a circumferentially disposed degree scale each value of which corresponding to a computed true heading at the point of its alignment with the said compass indicator member for a predetermined drift angle previously selected from said trigonometric scale-inscribed member for a particular wind velocity.

3. In an air-navigation computer as in claim 1, wherein said relative bearing pointer member comprises a circular disc having a flat underside rotatably engaged with said base disc member and an upper surface of varying thicknesses increasing inwardly from the outer circumference thereof to thus provide a series of circumferentially arranged supporting surfaces each being of appropriate width for thereby supporting each of the said trigonometric scale-inscribed, compass indicator and wind direction pointer members in corresponding closely adjacent and scale-reading relation to each other.

4. In an air-navigation computer as in claim 3, wherein said trigonometric scale-inscribed member comprises a first, relatively enlarged trig ring inscribed with sine indicia on its outer circumference and rotatably supported on said relative bearing pointer member adjacent to its outer edge surface of minimum thickness; said compass indicator member constitutes a second ring element having an outer circumference disposed inwardly of, and with its compass scale arranged immediately adjacent to that of said trig ring and rotatably supported on a circumferential surface of said relative bearing pointer element of increased thickness; and said wind direction pointer scale member comprises a disclike element positioned still further inwardly of, and in concentric relation within said compass indicator ring and incorporating an arcuate-shaped transparent window disposed along the circumference thereof with the said wind direction pointer element constituting a wind direction arrow centered on said window directly over said trig ring.

5. In an air-navigation computer as in claim 3, wherein said base disc member, relative bearing pointer member and master cursor each incorporate a drilled opening at the computer pivot center, and a center-fastening rivet for interconnection therewithin and to thereby assembly the said computer with both of said compass indicator ring and wind direction pointer disc being retained in normally slaved relation to said combined master cursor and relative bearing pointer disc members.

6. In an air-navigation computer as in claim 3, wherein said relative bearing pointer member incorporates a raised central portion permanently affixed to, and thus ensuring simultaneous and combined rotation with said master cursor.

7. In an air-navigation computer as in claim 4, wherein said trig ring incorporates an outer edge inscribed with trigonometric sine indicia marked clockwise from 1° to 90° and counterclockwise from 90° through 170°, and tinted respectively with a first color inwardly to include numeral values below 90°, and with a second color outwardly from the inner surface edge of the said ring member to include numeral values above 90°.

8. In an air-navigation computer as in claim 1, wherein said relative bearing pointer member comprises a circular disc unit inscribed with a relative bearing scale with indicia marked for each 2° both clockwise and counterclockwise from 0° to 180°, the surface background for said scale being tinted one color for degree values below 90°, and a second color for degree values above 90°.

9. In an air-navigation computer as in claim 8, wherein said relative bearing pointer member further incorporates a second scale circumferentially disposed and inscribed thereon further outwardly and nearly adjacent to said first named scale, said second scale includes values marked with indicia every 2° from 0° to 180° both clockwise and counterclockwise with the 180°-value thereof being positioned in direct alignment with both the 0°-value on said first scale and the said master cursor-index line.

10. In an air-navigation computer as in claim 1, wherein said apparatus comprises means to provide the continuous direct course tracking of an aircraft by reference to a selected TACAN ground station used in tactical air navigation and emanating radials about 360°-arc presenting both bearing and distance information of the aircraft from the selected station, said means comprising respectively adjusting the long tip of said master cursor and the index of said secondary cursor respectively over the values on said base disc member representing the departure and destination distances; thereafter rotating said compass indicator member to set the inbound bearing to the TACAN station under the long tip of said master cursor to thereby determine the relative degree value found on said relative bearing scale adjacent said destination radial; said trigonometric scale-inscribed member being further adapted to be than adjusted until the sum of the trig ring values under both of said cursors equals the previously noted relative degree value to thereby determine the direct course distance to the destination point from the reading on said base disc element directly opposite the said relative degree value on said trig ring, the bearing scale value equal to the trig ring value under said secondary cursor thereafter determining the computed direct course degree value on the said compass indicator member.

11. In an air-navigation computer as in claim 10, wherein said apparatus includes means for providing continuous tracking of an aircraft by reference to a selected TACAN ground station, said means comprising, a combined master cursor assembly including a relative bearing pointer disc permanently affixed thereto, and a compass indicator ring and wind direction pointer disc; a trig ring member rotatably positioned on said relative bearing pointer disc; a base disc for rotatably supporting said relative bearing pointer disc; and a secondary cursor rotatably positioned to the bottom of said base disc; said compass indicator ring being adapted to be adjusted to thereby maintain the inbound bearing to the selected TACAN station under the master cursor, and said combined master cursor assembly being rotated to thereby maintain the same trig ring degree value under said secondary cursor appearing on said relative bearing outer diameter scale opposite the previously determined direct course value on said compass indicator ring, the said master cursor assembly being thereby simultaneously adjusted relative to said base disc element to thereby indicate the desired distance to the said TACAN station, and the remaining direct course distance being determined, initially by noting the relative degree value on said outer diameter relative bearing scale appearing opposite the said destination radial value on the said compass indicator ring and subsequently reading the distance appearing opposite said relative degree value on aid base disc and trig ring respectively.

* * * * *